(12) United States Patent
Izawa et al.

(10) Patent No.: US 12,304,400 B2
(45) Date of Patent: May 20, 2025

(54) WIRE HARNESS WITH FIRST AND SECOND PATH RESTRICTORS AND FORMED AIR LAYER

(71) Applicant: SUMITOMO WIRING SYSTEMS, LTD., Yokkaichi (JP)

(72) Inventors: Katsutoshi Izawa, Yokkaichi (JP); Kosuke Tanaka, Yokkaichi (JP); Ryuta Saito, Yokkaichi (JP)

(73) Assignee: SUMITOMO WIRING SYSTEMS, LIMITED, Mie (JP)

( * ) Notice: Subject to any disclaimer, the term of this patent is extended or adjusted under 35 U.S.C. 154(b) by 164 days.

(21) Appl. No.: 18/031,708

(22) PCT Filed: Oct. 19, 2021

(86) PCT No.: PCT/JP2021/038628
§ 371 (c)(1),
(2) Date: Apr. 13, 2023

(87) PCT Pub. No.: WO2022/085684
PCT Pub. Date: Apr. 28, 2022

(65) Prior Publication Data
US 2023/0406240 A1    Dec. 21, 2023

(30) Foreign Application Priority Data

Oct. 23, 2020   (JP) ................ 2020-178422

(51) Int. Cl.
*B60R 16/02*     (2006.01)
*H02G 3/04*      (2006.01)
*H01B 7/00*      (2006.01)

(52) U.S. Cl.
CPC ...... *B60R 16/0215* (2013.01); *H02G 3/0468* (2013.01)

(58) Field of Classification Search
CPC ...... B60R 16/0215; B60R 16/02; F16L 57/00; H01B 7/00; H01B 7/0045; H02G 3/0462; H02G 3/0468; H02G 3/0418
USPC ........................................ 174/72 A
See application file for complete search history.

(56) References Cited

FOREIGN PATENT DOCUMENTS

| JP | S50-41120 Y2 | 11/1975 |
|----|---|---|
| JP | S59-23218 U | 2/1984 |
| JP | 2013-055760 A | 3/2013 |
| JP | 2016-032387 A | 3/2016 |
| JP | 2019-009839 A | 1/2019 |

OTHER PUBLICATIONS

Dec. 28, 2021 International Search Report issued in International Patent Application No. PCT/JP2021/038628.

*Primary Examiner* — Timothy J Thompson
*Assistant Examiner* — Michael F McAllister
(74) *Attorney, Agent, or Firm* — Oliff PLC

(57) ABSTRACT

A wire harness that includes: an electrical wire; an exterior tube covering an outer periphery of the wire; a first path restrictor attached on an outer peripheral side of the exterior tube; and a second path restrictor attached on an outer peripheral side of the first path restrictor, wherein the smooth outer surface of the first path restrictor and the smooth inner surface of the second path restrictor form an air layer therebetween.

12 Claims, 7 Drawing Sheets

WIRE HARNESS WITH FIRST AND SECOND PATH RESTRICTORS AND FORMED AIR LAYER

BACKGROUND

The present disclosure relates to a wire harness.

Conventionally, wire harnesses that include a corrugated tube covering the outer periphery of an electrical wire member and a path restricting member covering part of the corrugated tube in the circumferential direction thereof and restricting the path along which the wire member is routed are known (e.g., see JP 2013-55760A).

The corrugated tube of the wire harness described in JP 2013-55760A has a lengthwise slit formed therein. The path restricting member includes a path maintaining member provided around the outer periphery of the corrugated tube and an attachment member provided within the slit. The attachment member is configured to be latchable onto both a portion on the inner peripheral side of the slit and a portion on the outer peripheral side of the path maintaining member. The path of the wire member is restricted due to the corrugated tube, the path maintaining member and the attachment member being fixed by taping or the like.

A configuration is conceivable in which the wire harness is fixed to a vehicle body, due to the integrated corrugated tube and path restricting member being collectively bound together and held with a belt clamp, and the belt clamp being fixed to the vehicle body, for example.

SUMMARY

Incidentally, with a wire harness such as described above, since only a single path maintaining member is provided around the outer periphery of the corrugated tube, flexural rigidity could possibly be low. The flexural rigidity of the path restricting member being low is a factor leading to the wire member deviating from its path. Also, with a wire harness such as described above, since only a single path maintaining member is provided around the outer periphery of the corrugated tube, the temperature of the wire member could possibly tend to increase, in cases such as when disposed at a position close to a heat source of the vehicle, for example. As such, with a wire harness such as described above, there is a problem in that the function of protecting the wire member is poor.

An exemplary aspect of the disclosure provides a wire harness that is able to enhance the function of protecting an electrical wire member.

A wire harness of the present disclosure includes an electrical wire; an exterior tube covering an outer periphery of the wire; a first path restrictor attached on an outer peripheral side of the exterior tube, and a second path restrictor attached on an outer peripheral side of the first path restrictor, the first path restrictor having a first main body covering part of an outer periphery of the exterior tube; and a first insertion opening formed by both circumferential ends of the first main body, extending along a lengthwise direction of the first path restrictor over an entirety thereof in the lengthwise direction, and configured for the exterior tube to be insertable therein, and the second path restrictor having a second main body covering part of an outer periphery of the first path restrictor, and a second insertion opening formed by both circumferential ends of the second main body, extending along a lengthwise direction of the second path restrictor over an entirety thereof in the lengthwise direction, and configured for the first path restrictor to be insertable therein.

According to a wire harness of the present disclosure, the function of protecting an electrical wire can be enhanced.

DETAILED DESCRIPTION OF EMBODIMENTS

Description of Embodiments of Disclosure

Figure 1:
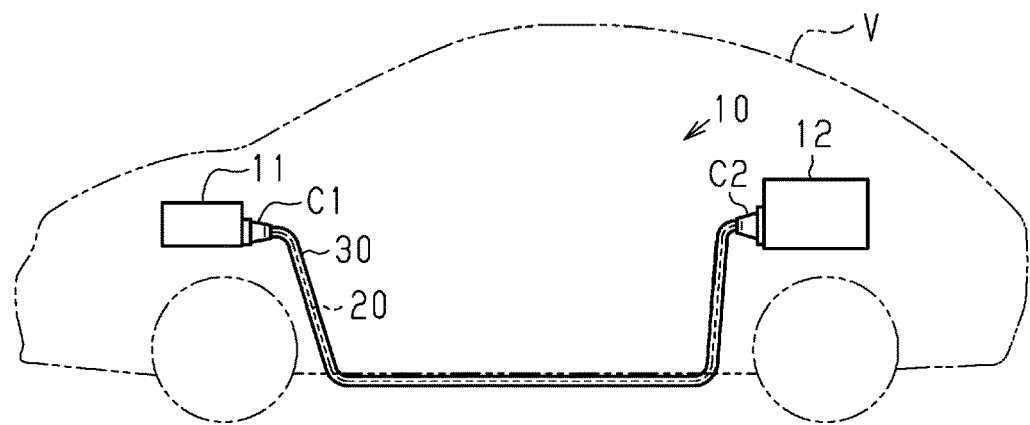
FIG. 1 is a schematic configuration diagram showing a wire harness of one embodiment.

Initially, modes of the present disclosure will be enumerated and described.

A wire harness of the present disclosure includes:

[1] an electrical wire member, a tubular exterior member covering an outer periphery of the wire member, a first path restricting member attached on an outer peripheral side of the exterior member, and a second path restricting member attached on an outer peripheral side of the first path restricting member, the first path restricting member having a first main body part covering part of the outer periphery of the exterior member, and a first insertion opening formed by both circumferential end portions of the first main body part, extending along a lengthwise direction of the first path restricting member over an entirety thereof in the lengthwise direction, and configured for the exterior member to be insertable therein, and the second path restricting member having a second main body part covering part of the outer periphery of the first path restricting member, and a second insertion opening formed by both circumferential end portions of the second main body part, extending along a lengthwise direction of the second path restricting member over an entirety thereof in the lengthwise direction, and configured for the first path restricting member to be insertable therein.

According to this configuration, the first path restricting member can be subsequently attached to the outer periphery of the exterior member through the first insertion opening. Also, the second path restricting member can be subsequently attached to the outer periphery of the first path restricting member through the second insertion opening. Further, since the first path restricting member and the second path restricting member are dually attached on the outer peripheral side of the exterior member, the flexural rigidity of the wire harness at that portion can be increased, for example. Therefore, deviation of the wire member from its path can be suppressed. Also, since the first path restricting member and the second path restricting member are dually attached on the outer peripheral side of the exterior member, an increase in the temperature of the wire member can be suppressed at that portion, in cases such as when disposed at a position close to a heat source of the vehicle, for example. These factors enable the function of protecting the wire member to be enhanced.

[2] Preferably, the second path restricting member is made of metal.

According to this configuration, since the second path restricting member is made of metal, an increase in the temperature of the wire member can be further suppressed at that portion, in cases such as when disposed at a position close to a heat source of the vehicle, for example.

[3] Preferably, the first path restricting member is made of resin.

According to this configuration, since the first path restricting member is made of resin, wearing of the exterior member due to rubbing against a metal member can be suppressed. That is, when the first path restricting member is made of metal, the exterior member could possibly wear easily due to rubbing against the metal first path restricting member, but this can be avoided.

[4] Preferably, the second path restricting member is made of resin and is colored.

According to this configuration, since the second path restricting member is made of resin and is colored, the type of the wire harness or the like is recognizable to a technician according to the color, for example. Therefore, in the case where a wire member includes high voltage electrical wires, for example, the technician can be made aware to not accidently cut the wire member. Also, the second path restricting member is made of resin, and thus can be easily manufactured without using a coating process or the like, by a resin material and a coating material being mixed together and molded, for example. That is, a coating process or the like is required after the molding when the second path restricting member is made of metal, but this can be avoided and the second path restricting member can be easily manufactured. Also, in the case where the second path restricting member is coated after being molded, for example, the color is unrecognizable when the second path restricting member becomes worn, but this can be avoided and it becomes possible to increase durability.

[5] Preferably, the second path restricting member is shorter than the first path restricting member.

According to this configuration, since the second path restricting member is shorter than the first path restricting member, the flexural rigidity of the wire harness can, for example, be increased locally in the region where the second path restricting member is arranged. Therefore, the entire wire harness can, for example, be made lighter, while locally increasing the flexural rigidity of the wire harness only in a region where it is particularly necessary.

[6] Preferably, a plurality of the second path restricting member are attached to the first path restricting member, and the plurality of second path restricting members are separated from each other in the lengthwise direction of the first path restricting member.

According to this configuration, the flexural rigidity of the wire harness can, for example, be increased locally in the plurality of regions where the second path restricting members are arranged. Therefore, the entire wire harness can, for example, be made lighter, while locally increasing the flexural rigidity of the wire harness only in a plurality of regions where it is particularly necessary.

[7] Preferably, the first path restricting member is shorter than the second path restricting member.

According to this configuration, since the first path restricting member is shorter than the second path restricting member, the flexural rigidity of the wire harness can, for example, be increased locally in the region where the first path restricting member is arranged. Therefore, the entire wire harness can, for example, be made lighter, while locally increasing the flexural rigidity of the wire harness only in a region where it is particularly necessary. Also, since heat is not easily transferred inwardly in the region forming an air layer between the exterior member and the second path restricting member, an increase in the temperature of the wire member can be further suppressed, in cases such as when disposed at a position close to a heat source of the vehicle, for example.

[8] Preferably, a plurality of the first path restricting member are attached to the exterior member, the plurality of first path restricting members are separated from each other in a lengthwise direction of the exterior member, and the second path restricting member is attached across the plurality of the first path restricting members.

According to this configuration, the flexural rigidity of the wire harness can be increased locally in the plurality of regions where the first path restricting members are arranged. Therefore, the entire wire harness can, for example, be made lighter, while locally increasing the flexural rigidity of the wire harness only in a plurality of regions where it is particularly necessary.

[9] Preferably, at least one of the first path restricting member and the second path restricting member has a protruding part protruding from the first main body part or the second main body part.

According to this configuration, since at least one of the first path restricting member and the second path restricting member has a protruding part that protrudes from the first main body part or the second main body part, the flexural rigidity of at least one of the first path restricting member and the second path restricting member can be increased. Therefore, deviation of the wire member from its path can be further suppressed.

[10] Preferably, the protruding part includes a first protruding part protruding toward the second main body part from the first main body part, and a second protruding part protruding toward the first main body part from the second main body part, and the first protruding part and the second protruding part are contactable with each other.

According to this configuration, since the first protruding part that protrudes toward the second main body part from the first main body part and the second protruding part that protrudes toward the first main body part from the second main body part are contactable with each other, circumferential rotation of the second path restricting member with respect to the first path restricting member can be suppressed. Also, since the region where the first protruding part and the second protruding part are not provided between the first main body part and the second main body part forms an air layer through which heat is not easily transferred, an increase in the temperature of the wire member can be further suppressed, in cases such as when disposed at a position close to a heat source of the vehicle, for example.

[11] Preferably, the second path restricting member is attached to the first path restricting member such that an orientation of the second insertion opening differs from an orientation of the first insertion opening.

According to this configuration, since the second path restricting member is attached to the first path restricting member such that the orientation of the second insertion opening differs from the orientation of the first insertion opening, the direction in which the flexural rigidity of the wire harness decreases is not concentrated in one direction. That is, when the orientation of the second insertion opening and the orientation of the first insertion opening coincide, a decrease in the flexural rigidity of the wire harness could possibly be concentrated in the direction in which the insertion openings are oriented, but this can be avoided. In other words, by adjusting the orientation of the first insertion opening and the orientation of the second insertion opening, the direction in which the flexural rigidity of the wire harness increases or decreases can be adjusted to a desired direction.

[12] Preferably, the first path restricting member has a pair of hold protruding parts protruding toward the exterior member from an inner surface of the first main body part and contacting an outer surface of the exterior member.

According to this configuration, since the first path restricting member has a pair of hold protruding parts that protrude toward the exterior member from the inner surface of the first main body part and contact the outer surface of the exterior member, detachment of the first path restricting member from the exterior member through the first insertion opening can be suppressed.

[13] Preferably, the hold protruding parts protrude from the inner surface of both circumferential end portions of the first main body part.

According to this configuration, detachment of the first path restricting member from the exterior member through the first insertion opening can be further suppressed, as compared with the case where the hold protruding parts protrude from the inner surface at positions slightly away from both circumferential end portions of the first main body part, for example.

DETAILED DESCRIPTION OF EMBODIMENTS OF DISCLOSURE

Specific examples of a wire harness of the present disclosure will be described below with reference to the drawings. In the individual diagrams, part of the configuration may be shown in an exaggerated manner or a simplified manner, for convenience of description. Also, the dimensional ratios of various portions may differ in the individual diagrams. Note that the present disclosure is not limited to these illustrative examples and is defined by the claims, and all changes that come within the meaning and range of equivalency of the claims are intended to be embraced therein. Herein, "orthogonal" is not only strictly orthogonal but also includes generally orthogonal within a range that achieves the operation and effect of the present embodiment. Also, herein, "circular" and "circular arc shaped" are not only strictly circular and circular arc shaped but also include generally circular and circular arc shaped within a range that achieves the operation and effect of the present embodiment.

Overall Configuration of Wire Harness 10

A wire harness 10 shown in FIG. 1 electrically connects two electrical devices or three or more electrical devices. The wire harness 10 electrically connects an inverter 11 installed in a front part of a vehicle V such as a hybrid vehicle or an electric vehicle, and a high voltage battery 12 installed in the vehicle V rearward of the inverter 11. The wire harness 10 is, for example, routed so as to pass under the floor of the vehicle V. For example, an intermediate portion of the wire harness 10 in the lengthwise direction thereof is routed so as to pass outside the vehicle cabin such as under the floor of the vehicle V.

The inverter 11 is connected to a motor for driving wheels (not shown) that serves as a power source for vehicle travel. The inverter 11 generates AC power from the DC power of the high voltage battery 12 and supplies the AC power to the motor. The high voltage battery 12 is, for example, a battery capable of supplying a voltage of several hundred volts.

Figure 2:
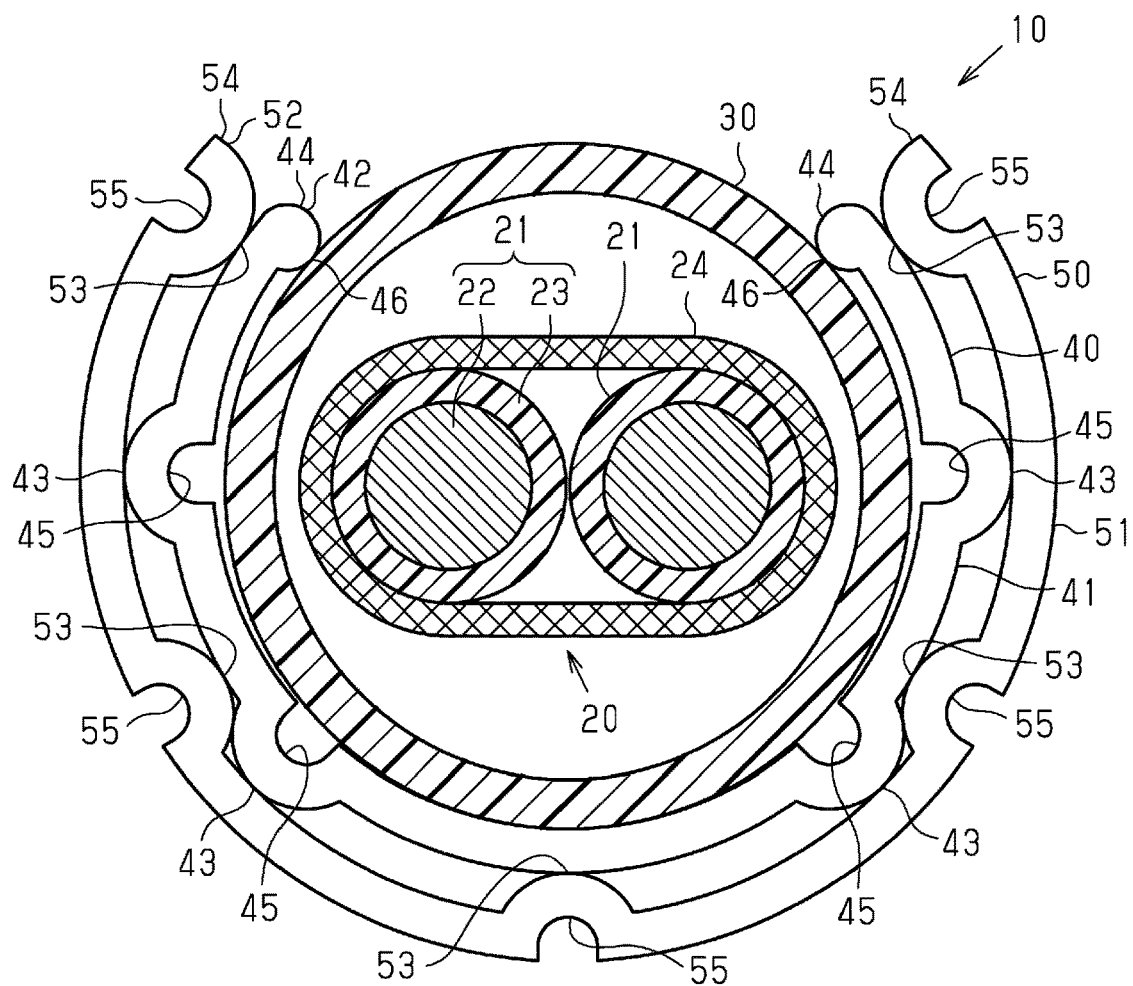
FIG. 2 is a cross-sectional view showing part of the wire harness of one embodiment.

As shown in FIG. 2, the wire harness 10 includes an electrical wire member 20 (electrical wire) that electrically connects the electrical devices to each other, and a tubular exterior member 30 (exterior tube) that covers the outer periphery of the wire member 20. Also, the wire harness 10 includes a first path restricting member 40 (first path restrictor) that is attached on the outer peripheral side of the exterior member 30 and a second path restricting member 50 (second path restrictor) that is attached on the outer peripheral side of the first path restricting member 40. The first path restricting member 40 and the second path restricting member 50 are for restricting the path along which the wire member 20 is routed. Specifically, the first path restricting member 40 and the second path restricting member 50 act such that the wire member 20 bends less easily than the wire member 20 in a state where the first path restricting member 40 and the second path restricting member 50 are not attached, and suppress shifting of the wire member 20 from its path.

Configuration of Wire Member 20

The wire member 20 includes one or more electrical wires 21 and a braided member 24 that collectively covers the outer periphery of the one or more wires 21. The wire member of the present embodiment has two wires 21. One end portion of the wire member 20 is connected to the inverter 11 via a connector C1, and the other end portion of the wire member 20 is connected to the high voltage battery 12 via a connector C2. The wire member 20 is formed in an elongated shape so as to extend in the front-rear direction of the vehicle, for example. The wires 21 are, for example, high voltage electrical wires capable of handling a high voltage and a large current. The wires 21 may, for example, be unshielded wires that do not have their own electromagnetic shielding structure, or shielded wires that have their own electromagnetic shielding structure.

Configuration of Wire 21

As shown in FIG. 2, the wire 21 is a coated electrical wire that has a core wire 22 composed of a conductor and an insulation coating 23 covering the outer periphery of the core wire 22.

Configuration of Core Wire 22

As the core wire 22, a twisted wire formed by combining a plurality of metal wire strands, a columnar conductor composed of one columnar metal rod having a solid structure internally, or a tubular conductor having a hollow structure internally, for example, can be used. A plurality of types of conductors such as a twisted wire, a columnar conductor and a tubular conductor, for example, can also be used as the core wire 22. Examples of the columnar conductor include a single core wire and a busbar. The core wire 22 of the present embodiment is a twisted wire. As the material of the core wire 22, a copper-based or aluminum-based metal material, for example, can be used.

The cross-sectional shape (hereinafter referred to as the transverse sectional shape) in which the core wire 22 is cut by a plane orthogonal to the lengthwise direction of the core wire 22, that is, orthogonal to the lengthwise direction of the wire 21, can be any shape. The transverse sectional shape of the core wire 22 is formed in a circular shape, a semicircular shape, a polygonal shape, a square shape or an oblate shape, for example. The transverse sectional shape of the core wire 22 of the present embodiment is formed in a circular shape.

Configuration of Insulation Coating 23

The insulation coating 23 covers the outer peripheral surface of the core wire 22 around the entire circumference, for example. The insulation coating 23 is made of an insulating material such as a synthetic resin, for example. As the material of the insulation coating 23, a synthetic resin whose main component is a polyolefin resin such as cross-linked polyethylene or cross-linked polypropylene, for example, can be used. Also, as the material of the insulation coating 23, one type of material may be used alone, or two or more types of materials may be used in combination as appropriate.

Configuration of Braided Member 24

The braided member 24 has a tubular shape that collectively covers the outer periphery of the wires 21 as a whole, for example. The braiding member 24 is provided so as to cover the outer periphery of the wires 21 along approximately the entirety of the wires 21 in the lengthwise direction thereof, for example. As the braided member 24, a braided wire in which a plurality of metal wire strands are braided or a braided wire in which metal wire strands and resin wire strands are braided together can be used. As the material of the metal wire strands, a copper-based or aluminum-based metal material, for example, can be used. Although not shown in the diagrams, the braided member 24 is grounded at the connectors C1 and C2 and the like, for example.

Configuration of Exterior Member 30

Figure 3:
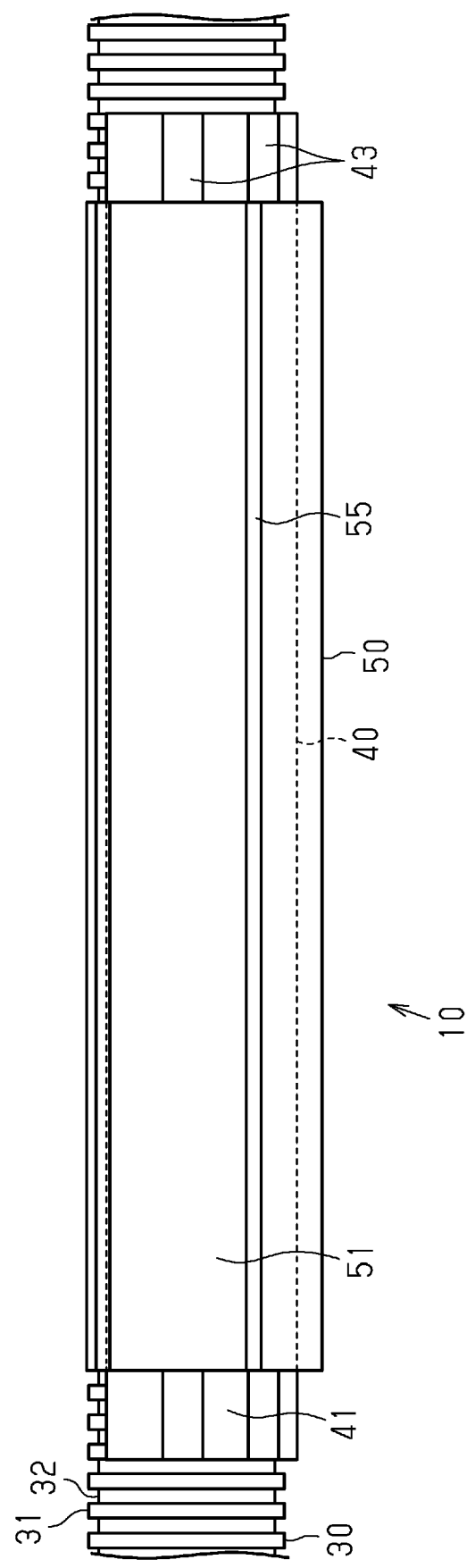
FIG. 3 is a side view showing part of the wire harness of one embodiment.
Figure 4:
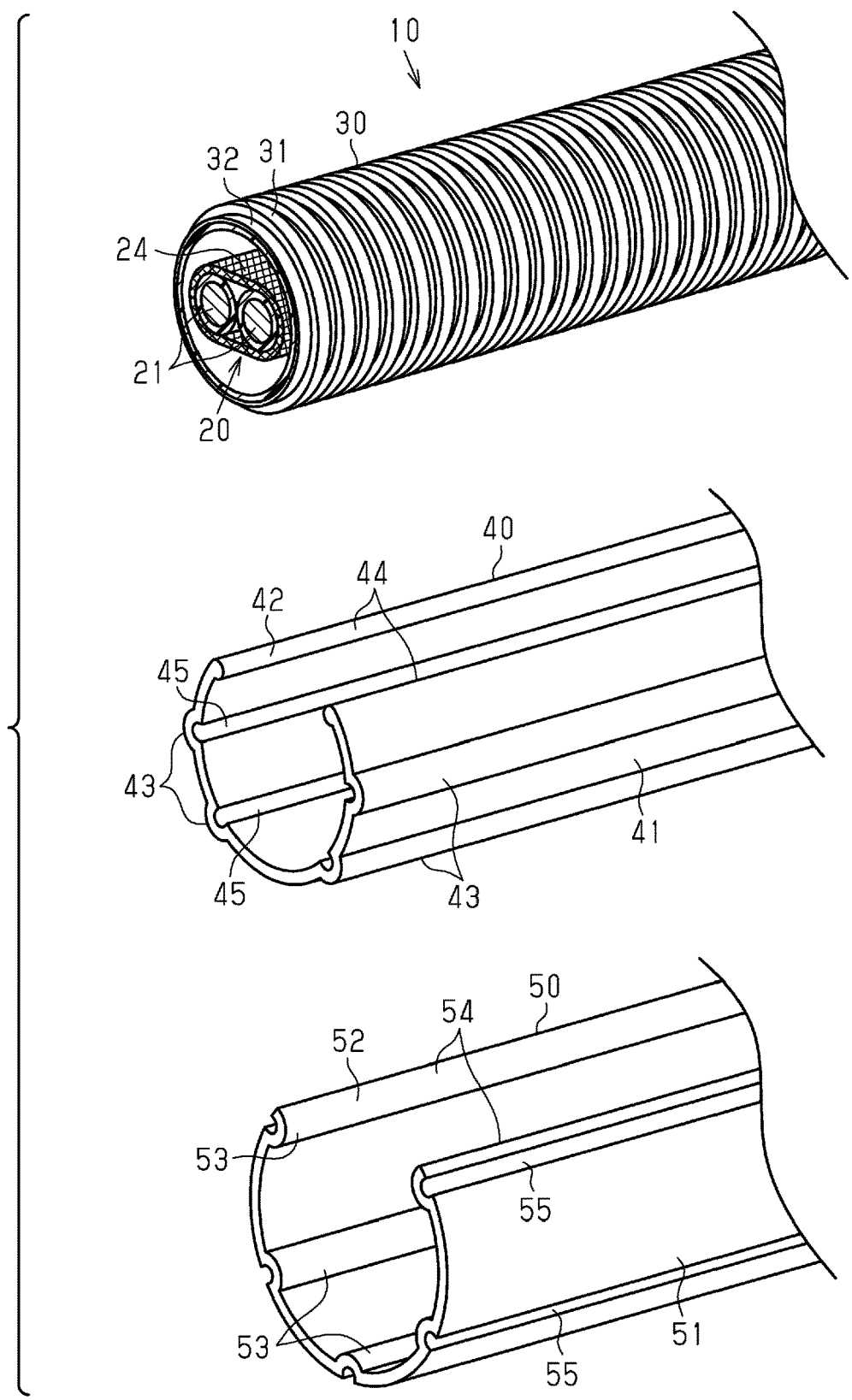
FIG. 4 is a partially exploded perspective view of the wire harness of one embodiment.

As shown in FIGS. 2 to 4, the exterior member 30 has a cylindrical shape that covers the outer periphery of the wire member 20 around its entirety in the circumferential direction. The exterior member 30 is sealed around its entirety in the circumferential direction. The exterior member 30 is provided so as to cover a lengthwise part of the outer periphery of the wire member 20, for example. As shown in FIG. 4, the exterior member 30 of the present embodiment is a corrugated tube having a bellows structure in which an annular raised part 31 and an annular recessed part 32 are alternately provided continuously along the lengthwise direction thereof. The exterior member 30 has flexibility.

As the material of the exterior member 30, a resin material that has conductivity or a resin material that does not have conductivity, for example, can be used. As the resin material, a synthetic resin such as polyolefin, polyamide, polyester or ABS resin, for example, can be used.

Configuration of First Path Restricting Member 40

As shown in FIGS. 2 and 4, the first path restricting member 40 covers a range spanning more than half of the outer periphery of the exterior member 30 in the circumferential direction of the exterior member 30 and extends along the lengthwise direction of the exterior member 30. The first path restricting member 40 of the present embodiment is attached to the outer periphery of a portion of the routing path of the wire member 20 where the exterior member 30 passing under the floor of the vehicle V or the like extends linearly.

The first path restricting member 40 is made of resin. As the material of the first path restricting member 40, a synthetic resin such as polypropylene, polyamide or polyacetal, for example, can be used. The first path restricting member 40 can be manufactured by a known manufacturing method such as extrusion molding or injection molding, for example. The first path restricting member 40 of the present embodiment has a constant cross-sectional shape as seen from the lengthwise direction. The first path restricting member 40 is an extrusion molded article. The first path restricting member 40 is more rigid than the exterior member 30. That is, the hardness of the first path restricting member 40 is set such that the first path restricting member 40 is less bendable than the exterior member 30. In other words, the first path restricting member 40 is set to a higher flexural rigidity than the exterior member 30.

As shown in FIG. 2, the first path restricting member 40 has a first main body part 41 (first main body), a first insertion opening 42, and a first protruding part 43 (first protrusion) that serves as a protruding part. The first main body part 41 is formed so as to cover a range spanning more than half of the outer periphery of the exterior member 30 in the circumferential direction of the exterior member 30. The first insertion opening 42 is formed by both circumferential end portions 44 of the first main body part 41, extends along the lengthwise direction of the first path restricting member 40 over the entirety thereof in the lengthwise direction, and is configured for the exterior member 30 to be insertable therein.

The first protruding part 43 protrudes from the outer periphery of the first main body part 41 and extends along the lengthwise direction of the first path restricting member 40.

Specifically, a plurality of first protruding parts 43 are provided in the circumferential direction of the first main body part 41. The first protruding parts 43 of the present embodiment are provided two on one side and two on the other side of the first main body part 41 with respect to the circumferential center thereof. Also, the first path restricting member 40 of the present embodiment has a first groove part 45. The first groove part 45 is recessed from the inner periphery of the first main body part 41 at a position corresponding to the first protruding parts 43, and extends along the lengthwise direction of the first path restricting member 40. That is, the first protruding parts 43 are formed so as to jut outwardly of the first main body part 41 while keeping the thickness of the first main body part 41 substantially constant, and the first groove part 45 is recessed at a position corresponding to where the first protruding parts 43 jut out.

Also, the first path restricting member 40 has a pair of hold protruding parts 46 (holding protrusions) that protrude toward the exterior member 30 inserted therein and contact the outer surface of the exterior member 30 or, more specifically, the outer surface of the annular raised parts 31. The hold protruding parts 46 protrude from the inner surface of both circumferential end portions 44 of the first main body part 41. The transverse sectional shape of the hold protruding parts 46 is a semicircular shape, for example. The hold protruding parts 46 extend along the lengthwise direction of the first path restricting member 40 over the entirety thereof in the lengthwise direction.

The first insertion opening 42 extends over the entirety of the first path restricting member 40 in the lengthwise direction thereof. The opening width of the first insertion opening 42, that is, the shortest distance between the both circumferential end portions 44 of the first main body part 41 is smaller than the outer diameter of the exterior member 30.

When inserting the exterior member 30 into the first insertion opening 42 from a direction orthogonal to the lengthwise direction, the first path restricting member 40 is elastically deformed and the opening width of the first insertion opening 42 is enlarged. Once the exterior member 30 is inserted inside the first path restricting member 40, the first path restricting member 40 elastically returns toward its original shape. Since the opening width of the first insertion opening 42 thereby becomes smaller than the outer diameter of the exterior member 30, the first path restricting member 40 is attached to the exterior member 30.

Configuration of Second Path Restricting Member 50

As shown in FIGS. 2 and 4, the second path restricting member 50 covers a range spanning more than half of the outer periphery of the first path restricting member 40 in the circumferential of the first path restricting member 40 and extends along the lengthwise direction of the first path restricting member 40.

As shown in FIG. 3, the second path restricting member 50 is shorter than the first path restricting member 40. Further, the second path restricting member 50 is attached to a central portion of the first path restricting member 40 in the lengthwise direction thereof. That is, the second path restricting member 50 is attached to the first path restricting member in a manner that does not cover both end portions of the first path restricting member 40 in the lengthwise direction thereof.

The second path restricting member 50 is made of resin. As the material of the second path restricting member 50, a synthetic resin such as polypropylene, polyamide or polyacetal, for example, can be used. The second path restricting member 50 can be manufactured by a known manufacturing method such as extrusion molding or injection molding, for example. The second path restricting member 50 of the present embodiment has a constant cross-sectional shape as seen from the lengthwise direction. The second path restricting member 50 is an extrusion molded article. The second path restricting member 50 is more rigid than the exterior member 30. That is, the hardness of the second path restricting member 50 is set such that the second path restricting member 50 is less bendable than the exterior member 30. In other words, the second path restricting member 50 is set to a higher flexural rigidity than the exterior member 30.

Also, the second path restricting member 50 is colored. The second path restricting member 50 of the present embodiment is manufactured by a resin material and a coating material being mixed together and molded. In other words, the second path restricting member 50 is constituted by a colored synthetic resin material. The second path restricting member 50 is set to a color that enables a technician to recognize that the wires 21 included in the wire member 20 of the wire harness 10 are high voltage electrical wires.

As shown in FIG. 2, the second path restricting member 50 has a second main body part 51 (second main body), a second insertion opening 52, and a second protruding part 53 (second protrusion) that serves as a protruding part. The second main body part 51 is formed so as to cover a range spanning substantially the entirety of the outer periphery of the first path restricting member 40. The second insertion opening 52 is formed by both circumferential end portions 54 of the second main body part 51, extends along the lengthwise direction of the second path restricting member 50 over the entirety thereof in the lengthwise direction, and is configured for the first path restricting member 40 to be insertable therein.

The second protruding part 53 protrudes from the inner periphery of the second main body part 51 and extends along the lengthwise direction of the second path restricting member 50.

Specifically, a plurality of second protruding parts 53 are provided in the circumferential direction of the second main body part 51. The second protruding parts 53 of the present embodiment are provided two on one side and two on the other side of the second main body part 51 with respect to the circumferential center thereof. Also, the second protruding parts 53 are provided at both circumferential end portions 54 of the second main body part 51. The second protruding parts 53 are provided in the circumferential center of the second main body part 51. Also, the second path restricting member 50 of the present embodiment has a second groove part 55. The second groove part 55 is recessed from the outer periphery of the second main body part 51 at a position corresponding to the second protruding parts 53, and extends along the lengthwise direction of the second path restricting member 50. That is, the second protruding parts 53 are formed so as to jut inwardly of the second main body part 51 while keeping the thickness of the second main body part 51 substantially constant, and the second groove part 55 is recessed at a position corresponding to where the second protruding parts 53 jut out.

The first protruding parts 43 protrude toward the second main body part 51. The top part of the first protruding parts 43 is set so as to contact the second main body part 51. Also, the second protruding parts 53 protrude toward the first main body part 41. The top part of the second protruding parts 53 is set so as to contact the first main body part 41. Further, some of the first protruding parts 43 and second protruding parts 53 are configured to be contactable with each other in the circumferential direction of the first path restricting member 40 and the second path restricting member 50. In the present embodiment, some of the second protruding parts 53 contacts a first protruding part 43 one way in the circumferential direction of the first path restricting member 40. Also, some of the second protruding parts 53 contact a first protruding part 43 the other way in the circumferential direction of the first path restricting member 40. The second path restricting member 50 is thereby restricted from rotating in both ways in the circumferential direction with respect to the first path restricting member 40.

The second insertion opening 52 extends over the entirety of the second path restricting member 50 in the lengthwise direction thereof. The opening width of the second insertion opening 52, that is, the shortest distance between both circumferential end portions 54 of the second main body part 51, is smaller than the maximum outer diameter of the first path restricting member 40.

Further, the second path restricting member 50 is attached to the first path restricting member 40 such that the orientation of the second insertion opening 52 coincides with the orientation of the first insertion opening 42.

When inserting the first path restricting member 40 into the second insertion opening 52 from a direction orthogonal to the lengthwise direction, the second path restricting member 50 is elastically deformed and the opening width of the second insertion opening 52 is enlarged. Once the first path restricting member 40 is inserted inside the second path restricting member 50, the second path restricting member 50 elastically returns toward its original shape. Since the opening width of the second insertion opening 52 thereby becomes smaller than the outer diameter of the first path restricting member 40, the second path restricting member 50 is attached to the first path restricting member 40.

The operation of the present embodiment will now be described.

According to the wire harness 10 of the present embodiment, the first path restricting member 40 can be subsequently attached to the outer periphery of the exterior member 30 through the first insertion opening 42. In other words, the first path restricting member 40 can be assembled to the exterior member 30 from a direction orthogonal to the lengthwise direction of the exterior member 30. Also, the second path restricting member 50 can be subsequently attached to the outer periphery of the first path restricting member 40 through the second insertion opening 52. In other words, the second path restricting member 50 can be assembled to the first path restricting member 40 from a direction orthogonal to the lengthwise direction of the first path restricting member 40.

Further, in the region where the first path restricting member 40 and the second path restricting member 50 are dually attached on the outer peripheral side of the exterior member bending of the wire harness 10 is suppressed even when subjected to vibration or an external force of some sort, for example.

The effect of the present embodiment will now be described.

(1) The first path restricting member 40 can be subsequently attached to the outer periphery of the exterior member 30 through the first insertion opening 42. Also, the second path restricting member 50 can be subsequently attached to the outer periphery of the first path restricting member 40 through the second insertion opening 52. Further, since the first path restricting member 40 and the second path restricting member 50 are dually attached on the outer peripheral side of the exterior member 30, the flexural rigidity of the wire harness 10 at that portion can be increased, for example. Therefore, deviation of the wire member 20 from its path can be suppressed. Also, since the first path restricting member 40 and the second path restricting member 50 are dually attached on the outer peripheral side of the exterior member 30, an increase in the temperature of the wire member 20 at that portion can be suppressed, in cases such as when disposed at a position close to a heat source of the vehicle V, for example. These factors enable the function of protecting the wire member 20 to be increased in the wire harness 10 of the present embodiment.

(2) Since the first path restricting member 40 is made of resin, wearing of the exterior member 30 due to rubbing against a metal member and can be suppressed. That is, when the first path restricting member 40 is made of metal, the exterior member 30 may easily wear due to rubbing against the metal first path restricting member 40, but this can be avoided.

(3) Since the second path restricting member 50 is made of resin and is colored, the type of the wire harness 10 or the like is recognizable to a technician according to the color, for example. Therefore, in cases such as where the wire member 20 includes high voltage electrical wires, the technician can be made aware to not accidently cut the wire member 20, for example. Also, the second path restricting member 50 is made of resin, and thus can be easily manufactured without using a coating process or the like, by a resin material and a coating material being mixed together and molded, for example. That is, a coating process or the like is required after the molding when the second path restricting member 50 is made of metal, but this can be avoided and the second path restricting member 50 can be easily manufactured. Also, in the case where the second path restricting member 50 is coated after being molded, for example, the color is unrecognizable when the second path restricting member 50 becomes worn, but this can be avoided and it becomes possible to increase durability.

(4) Since the second path restricting member 50 is shorter than the first path restricting member 40, the flexural rigidity of the wire harness 10 can, for example, be increased locally in the region where the second path restricting member 50 is arranged. Therefore, the entire wire harness 10 can, for example, be made lighter, while locally increasing the flexural rigidity of the wire harness 10 only in a region where it is particularly necessary.

(5) The first path restricting member 40 has the first protruding parts 43 serving as protruding parts that protrude from the first main body part 41. Also, the second path restricting member 50 has the second protruding parts 53 serving as protruding parts that protrude from the second main body part 51. Therefore, the flexural rigidity of the first path restricting member 40 and the second path restricting member 50 can be increased. Therefore, deviation of the wire member 20 from its path can be further suppressed.

(6) The first protruding parts 43 that protrude toward the second main body part 51 from the first main body part 41 and the second protruding parts 53 that protrude toward the first main body part 41 from the second main body part 51 are contactable with each other. Rotation of the second path restricting member 50 circumferentially with respect to the first path restricting member 40 can thereby be suppressed. Also, since the region where the first protruding parts 43 and the second protruding parts 53 are not provided between the first main body part 41 and the second main body part 51 forms an air layer through which heat is not easily transferred, an increase in the temperature of the wire member 20 can be further suppressed, in cases such as when disposed at a position close to a heat source of the vehicle V, for example.

(7) Since the first path restricting member 40 has the pair of hold protruding parts 46 that protrude from the inner surface of the first main body part 41 toward the exterior member 30 and contact the outer surface of the exterior member 30, detachment of the first path restricting member 40 from the exterior member 30 through the first insertion opening 42 can be suppressed.

(8) The hold protruding parts 46 protrude from the inner surface of both circumferential end portions 44 of the first main body part 41. Therefore, detachment of the first path restricting member 40 from the exterior member 30 through the first insertion opening 42 can be further suppressed, as compared with the case where the hold protruding parts 46 protrude from the inner surface at positions slightly away from both circumferential end portions 44 of the first main body part 41, for example.

Example Changes

The present embodiment can be implemented in a changed manner as follows. The present embodiment and the following example changes can be implemented in combination with each other to the extent that there no technical inconsistencies.

In the above embodiment, one second path restricting member 50 is attached to one first path restricting member 40, but the present disclosure is not limited thereto, and a plurality of second path restricting members 50 may be attached to one first path restricting member 40.

Figure 5:
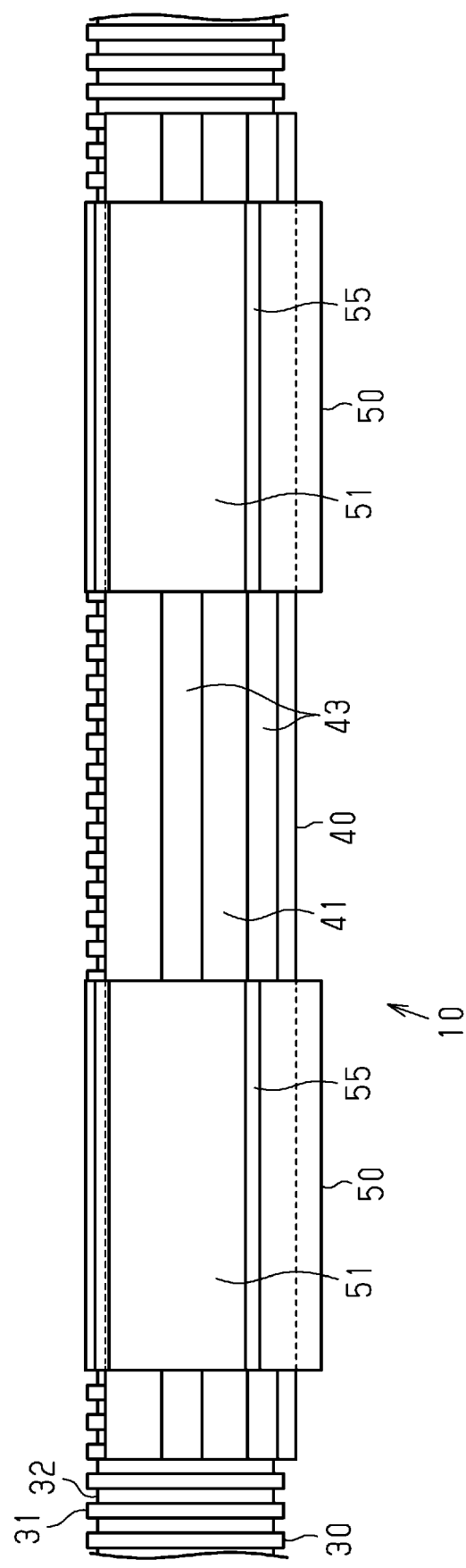
FIG. 5 is a side view showing part of a wire harness of another example.

For example, as shown in FIG. 5, a configuration may be adopted in which two second path restricting members 50 are attached to one first path restricting member 40, and the two second path restricting members 50 are separated from each other in the length direction of the first path restricting member 40.

By adopting such a configuration, the flexural rigidity of the wire harness 10 can, for example, be increased locally in the plurality of regions where the second path restricting members 50 are arranged. Therefore, the entire wire harness 10 can, for example, be made lighter, while locally increasing the flexural rigidity of the wire harness 10 only in a plurality of regions where it is particularly necessary.

In the above embodiment, the second path restricting member 50 is constituted to be shorter than the first path restricting member 40, but the present disclosure is not limited thereto, and the length of the second path restricting member 50 may be greater than or equal to the length of the first path restricting member 40.

Figure 6:
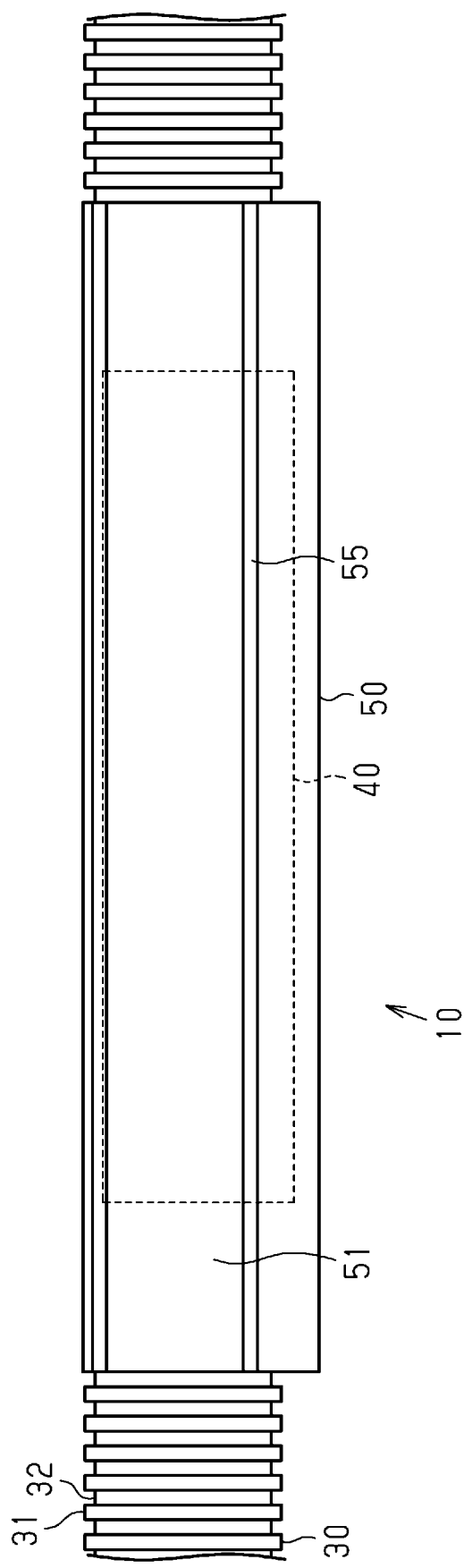
FIG. 6 is a side view showing part of a wire harness of another example.

For example, as shown in FIG. 6, a configuration may be adopted in which the second path restricting member 50 is longer than the first path restricting member 40 and is attached to the first path restricting member 40 so as to cover the entirety of the first path restricting member 40 in the lengthwise direction thereof.

By adopting such a configuration, the first path restricting member 40 is shorter than the second path restricting member 50, and thus the flexural rigidity of the wire harness 10 can, for example, be increased locally in the region where the first path restricting member 40 is arranged. Therefore, the entire wire harness 10 can, for example, be made lighter, while locally increasing the flexural rigidity of the wire harness 10 only in a region where it is particularly necessary. Also, since heat is not easily transferred inwardly in the region forming an air layer between the exterior member 30 and the second path restricting member an increase in the temperature of the wire member 20 can be further suppressed, in cases such as when disposed at a position close to a heat source of the vehicle V, for example.

Figure 7:
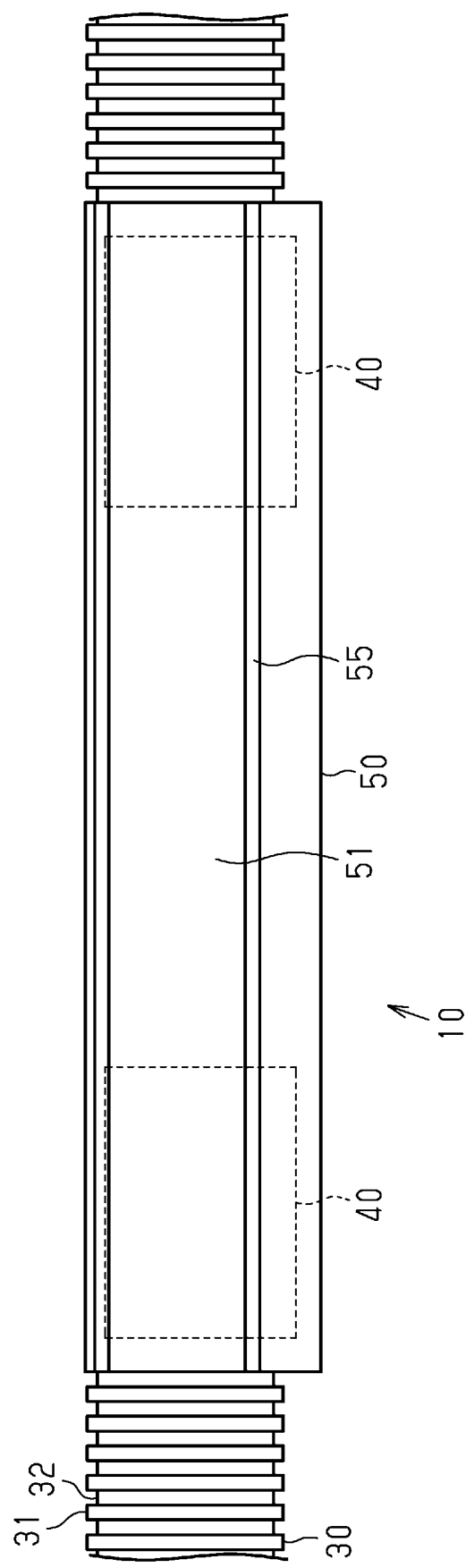
FIG. 7 is a side view showing part of a wire harness of another example.

Also, the configuration may be changed, as shown in FIG. 7, for example. In this example, a plurality of first path restricting members 40 are attached to the exterior member 30. The plurality of first path restricting members 40 are separated from each other in the lengthwise direction of the exterior member 30. The second path restricting member 50 is attached across the plurality of first path restricting members 40. That is, the second path restricting member 50 is attached to the plurality of first path restricting members 40 so as to collectively cover the plurality of first path restricting members 40.

By adopting such a configuration, the flexural rigidity of the wire harness 10 can be increased locally in the plurality of regions where the first path restricting members 40 are arranged. Therefore, the entire wire harness 10 can, for example, be made lighter, while locally increasing the flexural rigidity of the wire harness 10 only in a plurality of regions where it is particularly necessary.

In the above embodiment, the second path restricting member 50 is attached to the first path restricting member 40 such that the orientation of the second insertion opening 52 coincides with the orientation of the first insertion opening 42, but the present disclosure is not limited thereto, and the orientation of the second insertion opening 52 may differ therefrom.

Figure 8:
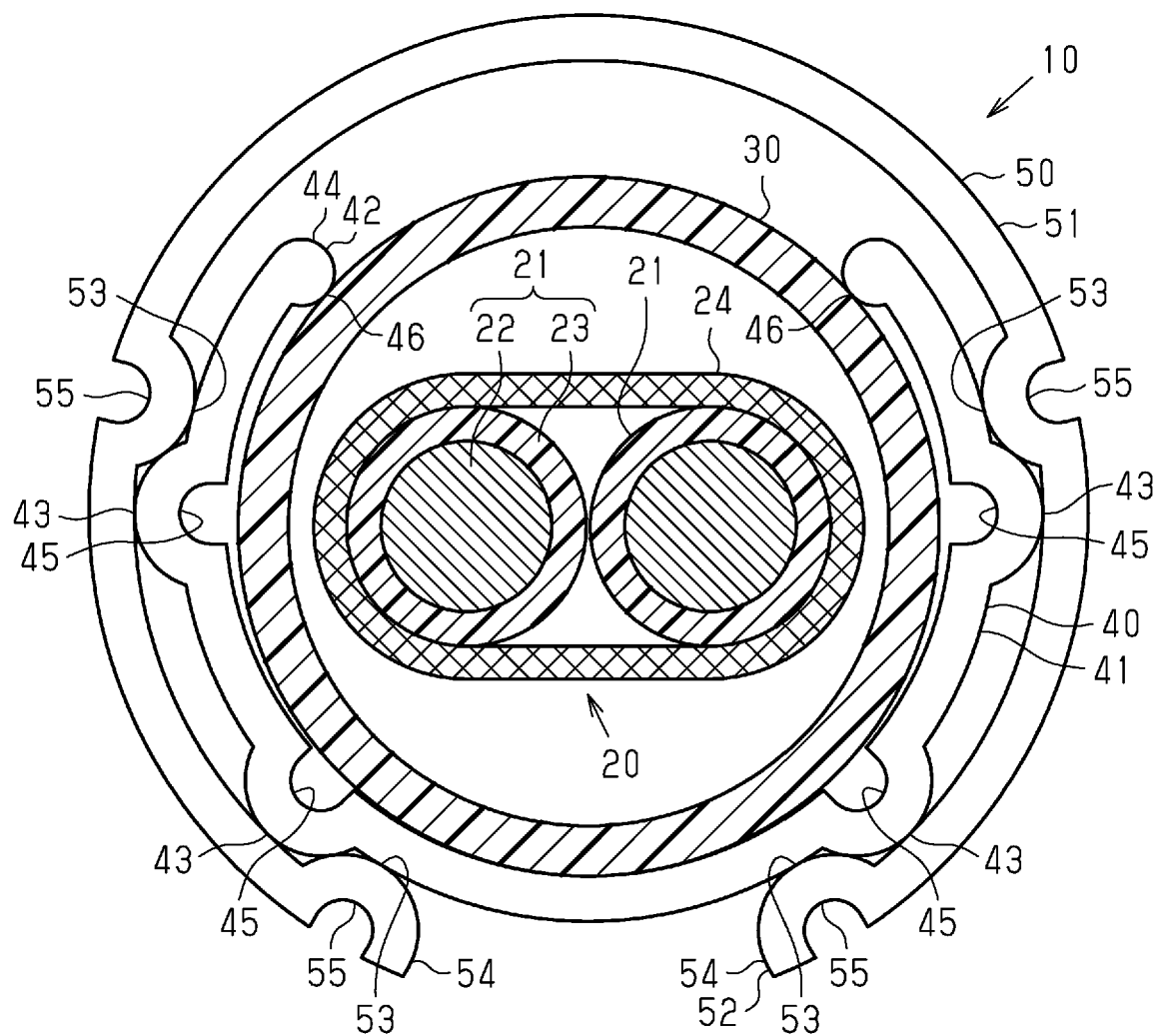
FIG. 8 is a cross-sectional view showing part of a wire harness of another example.

For example, as shown in FIG. 8, a configuration may be adopted in which the second path restricting member 50 is attached to the first path restricting member 40 such that the orientation of the second insertion opening 52 differs from the orientation of the first insertion opening 42. In this example, the orientation of the second insertion opening 52 is set so as to be directly opposite to the orientation of the first insertion opening 42. Also, the first insertion opening 42 is covered by the second main body part 51. Note that, of course, the orientation of the second insertion opening 52 need not be directly opposite to the orientation of the first insertion opening 42.

By adopting such a configuration, the direction in which the flexural rigidity of the wire harness 10 decreases is not concentrated in one direction. That is, when the orientation of the second insertion opening 52 and the orientation of the first insertion opening 42 coincide, a decrease in the flexural rigidity of the wire harness 10 could possibly be concentrated in the direction in which the insertion openings are oriented, but this can be avoided. In other words, by adjusting the orientation of the first insertion opening 42 and the orientation of the second insertion opening 52, the direction in which the flexural rigidity of the wire harness 10 increases or decreases can be adjusted to a desired direction. Also, since the first insertion opening 42 is covered by the second main body part 51, the intrusion of foreign matter in that region into where the exterior member 30 is disposed can be suppressed.

In the above embodiment, the first path restricting member 40 is made of resin, but is not limited thereto, and may be made of metal, for example. The first path restricting member 40 may, for example, be made of an iron-based, copper-based or aluminum-based metal material. When the first path restricting member 40 is made of metal in this way, an increase in the temperature of the wire member 20 at that portion can be suppressed, in cases such as when disposed at a position close to a heat source of the vehicle V, for example.

In the above embodiment, the second path restricting member 50 is made of resin, but is not limited thereto, and may be made of metal, for example. The second path restricting member 50 may, for example, be made of an iron-based, copper-based, or aluminum-based metal material. When the second path restricting member 50 is made of metal in this way, an increase in the temperature of the wire member 20 at that portion can be suppressed, in cases such as when disposed at a position close to a heat source of the vehicle V, for example. Also, if the second path restricting member 50 is made of metal while making the first path restricting member 40 of resin, an increase in the temperature of the wire member can be suppressed, while suppressing wearing of the exterior member 30 due to rubbing against the metal second path restricting member 50. In particular, if a configuration is adopted in which the second path restricting member 50 is shorter than the first path restricting member 40 and does not cover both end portions in the lengthwise direction of the first path restricting member 40, rubbing of the exterior member 30 against the metal second path restricting member 50 is further suppressed.

In the above embodiment, the second path restricting member 50 is colored, and is set to a color that enables a technician to recognize that the wires 21 included in the wire member 20 are high voltage electrical wires, but the present disclosure is not limited thereto. That is, the second path restricting member 50 may be a color unrelated to the type of the wires 21 or the like.

In the above embodiment, the first path restricting member 40 has the first protruding parts 43 serving as protruding parts that protrude from the first main body part 41, but is not limited thereto, and may be constituted to not have the first protruding parts 43. Also, the second path restricting member 50 has the second protruding parts 53 serving as protruding parts that protrude from the second main body part 51, but is not limited thereto, and may be constituted to not have the second protruding parts 53. Also, a configuration may be adopted in which the first path restricting member 40 does not have the first protruding parts 43, and the second path restricting member 50 does not have the second protruding parts 53.

Also, the first protruding parts 43 protrude from the outer periphery of the first main body part 41, but are not limited thereto, and may be configured to protrude from the inner periphery of the first main body part 41. Also, the second protruding parts 53 protrude from the inner periphery of the second main body part 51, but are not limited thereto, and may be configured to protrude from the outer periphery of the second main body part 51. Also, in the above embodiment, some of the first protruding parts 43 and second protruding parts 53 are contactable with each other in the circumferential direction of the first path restricting member 40 and second path restricting member 50, but are not limited thereto, and may be configured to be noncontactable. Also, the number of first protruding parts 43 and second protruding parts 53 may be changed.

In the above embodiment, the first path restricting member 40 has the first groove parts 45 at positions corresponding to the first protruding parts 43, but is not limited thereto, and may be constituted to not have the first groove parts 45.

In the above embodiment, the second path restricting member 50 has the second groove parts 55 at positions corresponding to the second protruding parts 53, but is not limited thereto, and may be constituted to not have the second groove parts 55.

In the above embodiment, the first path restricting member 40 has the hold protruding parts 46 that contact the outer surface of the exterior member 30, but is not limited thereto, and may be constituted to not have the hold protruding parts 46. Also, a configuration may be adopted in which the hold protruding parts 46 protrude from the inner surface at positions slightly away from both circumferential end portions 44 of the first main body part 41.

In the above embodiment, the first path restricting member 40 and the second path restricting member 50 are more rigid than the exterior member 30, but are not limited thereto, and may be constituted to be of equivalent hardness to the exterior member 30 or of lower hardness. That is, as long as the first path restricting member 40 and the second path restricting member 50 act such that the wire member 20 bends less easily than the wire member 20 in a state where the first path restricting member 40 and the second path restricting member 50 are not attached, the rigidity thereof need not be greater than the exterior member The exterior member 30 may have a metal layer including a metal material that is provided on the outer surface of the corrugated tube. Such a metal layer can be provided by plating, for example. The metal layer is preferably provided on the entire outer surface of the annular raised parts 31 and the annular recessed parts 32 of the corrugated tube. A metal material such as aluminum whose emissivity is small, for example, is preferably used for the innermost surface of the metal layer. According to such a configuration, an increase in the temperature inside the exterior member 30, and, consequently, an increase in the temperature of the wire member 20, can be suppressed, in cases such as when disposed at a position close to a heat source of the vehicle, for example.

The exterior member 30 may have a slit that extends in the lengthwise direction of the exterior member 30. In this case, the exterior member 30 is preferably sealed around the entirety thereof in the circumferential direction, by taping the outer periphery of the exterior member 30, for example, so as to close the slit over the entirety thereof in the lengthwise direction of the exterior member 30. Deterioration in the water stopping performance of the exterior member 30 having the slit can thereby be suppressed.

The wire member 20 may have one wire 21 or may have three or more wires 21.

The braided member 24 can also be omitted from the wire member 20.

The first path restricting member 40 and the second path restricting member 50 are not limited to a path restricting member provided under the floor of the vehicle V. As long as a portion of the routing path of the wire member 20 extends linearly, the first path restricting member 40 and the second path restricting member 50 may, for example, be provided within the vehicle cabin of the vehicle V.

The first path restricting member 40 may be referred to as a radial inner or small diameter path restricting member, and the second path restricting member 50 may be referred to as a radial outer or large diameter path restricting member.

Supplementary Note 1

As shown in FIGS. 2 to 8, in some modes of the present disclosure, a wire harness (10) can include:
an electrical wire member (20),
a tubular exterior member (30) covering an outer periphery of the wire member (20),
a first path restricting member (40) having a predetermined lengthwise profile that can be a linear profile and a predetermined cross-sectional profile that can be a C-shaped cross-sectional profile, the first path restricting member (40) being attached to an outer peripheral surface of the exterior member (30) by a snap-fit, for example, and configured to restrict a lengthwise shape of the wire harness (10), and
a second path restricting member (50) having a predetermined lengthwise profile that can be a linear profile and a predetermined cross-sectional profile that can be a C-shaped cross-sectional profile, the second path restricting member (50) being attached to an outer peripheral surface of the first path restricting member (40), by a snap-fit, for example, and configured to restrict the lengthwise shape of the wire harness (10).

Supplementary Note 2

As shown in FIG. 5, in some modes of the present disclosure, the first path restricting member (40) may be attached to the wire harness (10) so as to cover a first lengthwise position of the wire harness (10) and a second lengthwise position different from the first lengthwise position, and the wire harness (10) can include:
a second path restricting member (50) attached to the first path restricting member (40) at the first lengthwise position; and
another second path restricting member (50) attached to the first path restricting member (40) at the second lengthwise position.

Supplementary Note 3

As shown in FIGS. 3 and 5, in some modes of the present disclosure, the second path restricting member (50) may partially cover the first path restricting member (40) in a lengthwise direction.

Supplementary Note 4

As shown in FIGS. 6 and 7, in some modes of the present disclosure, the second path restricting member (50) may completely cover the first path restricting member (40) in the lengthwise direction.

Supplementary Note 5

As shown in FIG. 7, in some modes of the present disclosure, the wire harness (10) can include:
the first path restricting member (40) attached to the exterior member (30) at the first lengthwise position of the wire harness (10);
another first path restricting member (40) attached to the exterior member (30) at the second lengthwise position of the wire harness (10) different from the first lengthwise position; and
the second path restricting member (50) covering the first path restricting member (40) at the first lengthwise position and the other first path restricting member (40) at the second lengthwise position.

Supplementary Note 6

As shown in FIGS. 2, 4, and 8, in some modes of the present disclosure,
an outer surface of the first path restricting member (40) may have a plurality of first protruding parts (43) extending over an entire length of the first path restricting member (40) and protruding radially outward, and a smooth outer surface excluding the first protruding parts (43),
an inner surface of the second path restricting member (50) may have a plurality of second protruding parts (53) extending over an entire length of the second path restricting member (50) and protruding radially outward, and a smooth outer surface excluding the second protruding parts (53),
each first protruding part (43) of the first path restricting member (40) may contact the smooth inner surface of the second path restricting member (50),
each second protruding part (53) of the second path restricting member (50) may contact the smooth outer surface of the first path restricting member (40), and the smooth outer surface of the first path restricting member (40) and the smooth inner surface of the second path restricting member (50) may form an air layer therebetween.

Supplementary Note 7

As shown in FIGS. 2, 4, and 8, in some modes of the present disclosure,
one or more first protruding parts (43) of the first path restricting member (40) may contact one corresponding second protruding part (53) of the second path restricting member (50).

Supplementary Note 8

As shown in FIG. 8, in some modes of the present disclosure, each first protruding part (43) of the first path restricting member (40) may contact one corresponding second protruding part (53) of the second path restricting member (50).

Supplementary Note 9

As shown in FIGS. 2, 4 to 7, in some modes of the present disclosure, the outer surface of the exterior member (30) may not be covered by the first path restricting member (40) and the second path restricting member (50), and may include an exposed outer surface exposed from the first insertion opening (42) of the first path restricting member (40) and the second insertion opening (52) of the second path restricting member (50).

Supplementary Note 10

As shown in FIGS. 2, 3, 5 to 7, in some modes of the present disclosure, an uppermost position of the second path restricting member (50) which can be an end portion (54) of the second path restricting member (50) may coincide in a height direction with an uppermost position of the exterior member (30) which can be part of the outer surface of the exterior member (30).

The invention claimed is:
1. A wire harness comprising:
an electrical wire;
an exterior tube covering an outer periphery of the wire;
a first path restrictor attached on an outer peripheral side of the exterior tube; and
a second path restrictor attached on an outer peripheral side of the first path restrictor, wherein:
the first path restrictor has:
a first main body covering part of an outer periphery of the exterior tube; and
a first insertion opening formed by both circumferential ends of the first main body, extending along a lengthwise direction of the first path restrictor over an entirety thereof in the lengthwise direction, and configured for the exterior tube to be insertable therein,
an outer surface of the first path restrictor has a plurality of first protrusions extending over an entire length of the first path restrictor and protruding radially outward, and a smooth outer surface excluding the plurality of first protrusions,
the second path restrictor has:
a second main body covering part of an outer periphery of the first path restrictor; and a second insertion opening formed by both circumferential ends of the second main body, extending along a lengthwise direction of the second path restrictor over an entirety thereof in the lengthwise direction, and configured for the first path restrictor to be insertable therein, an inner surface of the second path restrictor has a plurality of second protrusions extending over an entire length of the second path restrictor and protruding radially inward, and a smooth outer surface excluding the plurality of second protrusions, the plurality of first protrusions of the first path restrictor contact the smooth inner surface of the second path restrictor, the plurality of second protrusions of the second path restrictor contact the smooth outer surface of the first path restrictor, and the smooth outer surface of the first path restrictor and the smooth inner surface of the second path restrictor form an air layer therebetween.

2. The wire harness according to claim 1, wherein the second path restrictor is made of metal.

3. The wire harness according to claim 2, wherein the first path restrictor is made of resin.

4. The wire harness according to claim 1, wherein the second path restrictor is made of resin and is colored.

5. The wire harness according to claim 1, wherein the second path restrictor is shorter than the first path restrictor.

6. The wire harness according to claim 5, wherein:
the second path restrictor is a plurality of the second path restrictors that are attached to the first path restrictor, and
the plurality of second path restrictors are separated from each other in the lengthwise direction of the first path restrictor.

7. The wire harness according to claim 1, wherein the first path restrictor is shorter than the second path restrictor.

8. The wire harness according to claim 7, wherein:
the first path restrictor is a plurality of the first path restrictors that are attached to the exterior tube,
the plurality of first path restrictors are separated from each other in a lengthwise direction of the exterior tube, and
the second path restrictor is attached across the plurality of the first path restrictors.

9. The wire harness according to claim 1, wherein the plurality of first protrusions and the plurality of second protrusions are contactable with each other.

10. The wire harness according to claim 1, wherein the second path restrictor is attached to the first path restrictor such that an orientation of the second insertion opening differs from an orientation of the first insertion opening.

11. The wire harness according to claim 1, wherein the first path restrictor has a pair of holding protrusions protruding toward the exterior tube from an inner surface of the first main body and contacting an outer surface of the exterior tube.

12. The wire harness according to claim 11, wherein the pair of holding protrusions protrude from the inner surface of both circumferential ends of the first main body.

* * * * *